(12) United States Patent
Youn et al.

(10) Patent No.: US 8,792,564 B2
(45) Date of Patent: Jul. 29, 2014

(54) ADAPTIVE PREPROCESSING METHOD USING FEATURE-EXTRACTED VIDEO MAPS

(75) Inventors: Jeongnam Youn, San Jose, CA (US); Yushin Cho, Sunnyvale, CA (US); Daisuke Hiranaka, Milpitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1418 days.

(21) Appl. No.: 12/259,649

(22) Filed: Oct. 28, 2008

(65) Prior Publication Data

US 2010/0104027 A1    Apr. 29, 2010

(51) Int. Cl.
*H04N 7/26* (2006.01)

(52) U.S. Cl.
CPC ... *H04N 19/00066* (2013.01); *H04N 19/00903* (2013.01)
USPC ............. 375/240.29; 375/240; 375/240.01; 375/240.26

(58) Field of Classification Search
CPC .................. H04N 19/00066; H04N 19/00903
USPC ................. 375/240.29, 240, 240.01, 240.26
See application file for complete search history.

(56) References Cited

U.S. PATENT DOCUMENTS

| | | | | |
|---|---|---|---|---|
| 5,764,307 A * | 6/1998 | Ozcelik et al. | | 348/608 |
| 6,122,405 A * | 9/2000 | Khani | | 382/261 |
| 7,167,595 B2 | 1/2007 | Hiroshige et al. | | |
| 7,415,162 B2 * | 8/2008 | Suzuki et al. | | 382/246 |
| 2001/0045988 A1 * | 11/2001 | Yamauchi et al. | | 348/273 |
| 2002/0009137 A1 * | 1/2002 | Nelson et al. | | 375/240.1 |
| 2002/0064228 A1 * | 5/2002 | Sethuraman et al. | | 375/240.12 |
| 2002/0097335 A1 * | 7/2002 | Kobayashi et al. | | 348/384.1 |
| 2002/0150166 A1 * | 10/2002 | Johnson | | 375/240.29 |
| 2002/0151992 A1 * | 10/2002 | Hoffberg et al. | | 700/83 |
| 2003/0039310 A1 * | 2/2003 | Wu et al. | | 375/240.16 |
| 2003/0161407 A1 * | 8/2003 | Murdock et al. | | 375/240.29 |
| 2004/0170330 A1 * | 9/2004 | Fogg | | 382/232 |
| 2005/0036558 A1 * | 2/2005 | Dumitras et al. | | 375/240.29 |
| 2005/0226518 A1 * | 10/2005 | Suzuki et al. | | 382/246 |
| 2006/0133689 A1 * | 6/2006 | Andersson et al. | | 382/261 |

(Continued)

OTHER PUBLICATIONS

Huang; Adaptive noise reduction and image sharpening for digital video compression; Systems, Man, and Cybernetics, 1997. Computational Cybernetics and Simulation., 1997 IEEE International Conference on (vol. 4 ) pp. 3142-3147 vol. 4; Oct. 1997; IEEE Xplore.*

(Continued)

*Primary Examiner* — Bradley Holder
(74) *Attorney, Agent, or Firm* — John P. O'Banion (57) ABSTRACT

A method and apparatus for preprocessing a video signal prior to its being encoded. During preprocessing, features are extracted from the video signal into feature planes which are each adaptively filtered in response to estimations of feature activity. After feature extraction the signal which remains is referred to as a "remaining signal", which is then noise filtered to remove a substantial portion of the noise. The feature planes and remaining signal are recombined into a preprocessed output signal configured for receipt and processing by a video encoder. A video encoder receiving the preprocessed video signal can generate higher quality and/or lower bit rate encoded video than one receiving the original source video. Preprocessing according to the invention is particularly well suited for use with encoders adapted to remove temporal and/or spatial redundancy, such as those implemented according to the MPEG2/4, or AVC/H.264 standards.

18 Claims, 4 Drawing Sheets

(56) References Cited

U.S. PATENT DOCUMENTS

| | | | |
|---|---|---|---|
| 2006/0227862 A1* | 10/2006 | Campbell et al. | 375/240 |
| 2007/0064816 A1* | 3/2007 | Chiang et al. | 375/240.29 |
| 2007/0116373 A1* | 5/2007 | Hwang et al. | 382/261 |
| 2008/0192822 A1* | 8/2008 | Chang et al. | 375/240.03 |
| 2009/0074084 A1* | 3/2009 | Drezner et al. | 375/240.29 |

OTHER PUBLICATIONS

Winnemöller et al.; Real-time video abstraction; SIGGRAPH '06 ACM SIGGRAPH 2006 Papers pp. 1221-1226; ACM New York, NY, USA © 2006; Jul. 2006 ; ACM Digital Library.*

Harmonic Inc., Advanced MPEG-2 Encoding, white paper, 2001.

* cited by examiner

ADAPTIVE PREPROCESSING METHOD USING FEATURE-EXTRACTED VIDEO MAPS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding, and more particularly to an adaptive preprocessing method using feature-extracted video maps.

2. Description of Related Art

Digital video technology is used in business, communication, education and entertainment, and from on-line video archives on the Internet to high-definition TV. The ability to communicate and store video, such as for mobile video, streaming video, video storage, video broadcast and video conferencing depends largely on the ability to encode the video with sufficient quality and at a sufficiently low bit rate for the desired application.

However, despite the significant advancements in video encoder design, improved coding apparatus and methods are fiercely sought after. Any enhancement(s) which promise to mitigate the tradeoff between bit rate and quality garner intense interest within the industry.

Accordingly, a need exists for enhanced coding apparatus and methods which increase video quality and/or reduce bit rate without introducing undue levels of processing overhead. These needs and others are met within the present invention which overcomes the deficiencies of previously developed coding apparatus and methods.

BRIEF SUMMARY OF THE INVENTION

The present invention is an apparatus (system) and method of applying a preprocessing paradigm to the video encoding problem, for example preprocessing the video signal before it is encoded by a video codec, such as according to the MPEG2/4 or AVC/H.264 standards.

The proposed method first extracts all information features, which are deemed important in the current context, from the original source video. The remaining video signal is then processed toward a different object. In one preferred embodiment, noise-removal filtering is applied to this remaining data after feature extraction is performed. Random noise in the original source is thus effectively removed, without impacting the important feature elements. The extracted features are then processed adaptively, such as preferably based on the level of feature activity. If the level of activity is high, stronger filtering is applied to further remove the unnecessary information. Since the unnecessary information is removed before the encoding process, the coding efficiency (or video quality at the same given bit rate) in the video encoder can thus be improved.

The following terms are generally described in relation to the specification, and are not to be interpreted toward constraining specific recitations of the specification.

The term "video encoder" (also referred to as video conversion) is used herein to refer to the process of preparing the video for storage or output by encoding the digital video according to a given video format so that the video can be stored, transmitted, received and finally decoded back into a video signal which closely approximates the original video within the confines of allowable bit rate. Typical video encoders work toward eliminating temporal and/or spatial redundancy to reduce video bit rates while maintaining a desired level of perceived video quality.

The term "codec" is an acronym for "compressor/decompressor", and is also referred to as a "coder/decoder" as the term is used in the telecommunication arts. A codec is any technology for compressing and decompressing data, and may be implemented in software, hardware, or a combination thereof. Popular standards for codecs include MPEG (e.g., MPEG2, MPEG4), H.263/4, and the like. The present invention in particularly well suited for modern codecs which attempt to remove all temporal and/or spatial redundancies.

The invention is amenable to being embodied in a number of ways, including but not limited to the following descriptions.

One implementation of the invention is an apparatus for preprocessing a video signal prior to encoding, comprising: (a) means for extracting features from the source video into feature planes which are adaptively filtered; (b) means for noise reduction filtering of the remaining signal; and (c) means for recombining adaptively filtered feature planes with noise reduced versions of the remaining signal into a preprocessed video output configured for receipt by a video encoder.

An implementation of the present invention is a method of preprocessing a source video signal prior to encoding, comprising: (a) extracting features (e.g., edges, textures, gradient characteristics, activity, and so forth) from the source video and producing feature planes (feature mapping) and leaving a remaining signal which does not contain the extracted features; (b) noise reduction filtering of the remaining signal to remove at least a portion of the random noise within the remaining signal, such as using low pass filtering; (c) estimation of feature activity for the feature planes; (d) adaptive strength filtering on the feature planes (e.g., based on feature activity); and (e) combining adaptively filtered feature planes with the noise reduced version of the remaining signal to generate a preprocessed video output configured for receipt by a video encoder.

Overall, the preprocessing technique aggressively processes areas of complicated texture that are not sensitive to the human eye while other feature areas are processed, from delicately to aggressively, in response to their level of activity.

The preprocessing of the video source signal increases coding efficiency at a recipient video encoder allowing an increase in video quality and/or a lowered bit rate for a given encoded video quality. The method only requires the video signal to be received by an encoder, no additional information needs to be sent from the preprocessor to the encoder. However, it will be appreciated that if the encoder does not automatically adapt its encoding parameters in response to the clean (less noise) signal received from the preprocessor, then for optimum performance its encoding parameters should be externally modified. Preprocessing according to the present invention is compatible with a wide range of video encoders, and in particular with encoders operating according to MPEG2/4, AVC/H.264, or similar standards and combinations thereof.

Modes of the invention provide for selecting the features to be extracted in response to external control, or programming and/or data available to the preprocessor, or combinations thereof.

In one mode of the invention the block based adaptive strength filtering comprises steps of: (a) partitioning the feature plane into small blocks; (b) estimating activity within each block in response to a human perceptual model to output a degree of activity; (c) categorizing the block into one of multiple filter parameters; (d) deciding a set of filter parameters; and (e) performing the adaptive filtering on this feature plane.

An implementation can be executed from a computer processor in response to programming retrieved from a memory and executing on at least one computer processor. In one configuration at least one computer processor is integrated within a preprocessing module configured for connection to an encoder device. In one configuration at least one computer processor is integrated within an encoder device which is adapted to perform preprocessing and encoding. In one configuration at least a first computer processor performs preprocessing while at least a second computer processor performs encoding of the preprocessed video signal output. In one configuration at least one computer processor performs both preprocessing functions and encoding functions.

An implementation of the present invention is an apparatus for preprocessing video signals before receipt by an encoder, comprising: (a) a computer configured for processing received video signals; and (b) programming executable on the computer for, (b)(i) extracting features from the source video and producing feature planes and a remaining signal without the extracted features, (b)(ii) noise reduction filtering of the remaining signal, (b)(iii) estimation of feature activity for the feature planes, (b)(iv) adaptive strength filtering on the feature planes, and (b)(v) combining adaptively filtered feature planes with noise reduced version of the remaining signal to generate a preprocessed video output configured for receipt by a video encoder. The preprocessing of the video source signal increases coding efficiency at a recipient video encoder providing an increase in video quality increase and/or a lowered bit rate for a given encoded video quality.

An implementation of the present invention is a computer-readable media containing a computer program executable on a computer configured for processing a video signal and causing the computer to preprocess the video signal in preparation for receipt by an encoder, in response to steps, comprising: (a) extracting features from the video signal and producing feature planes and a remaining signal without the extracted features; (b) noise reduction filtering of the remaining signal; (c) estimation of feature activity for the feature planes; (d) adaptive strength filtering on the feature planes; and (e) combining adaptively filtered feature planes with noise reduced version of the remaining signal to generate a preprocessed video output configured for receipt by a video encoder. The preprocessing of the video source signal increases coding efficiency when received at a recipient video encoder providing an increase in video quality increase and/ or a lowered bit rate for a given encoded video quality.

The present invention provides a number of beneficial aspects which can be implemented either separately or in any desired combination without departing from the present teachings.

An aspect of the invention is a preprocessing method which increases coding efficiency when the preprocessed video signal is encoded within a recipient video encoder.

Another aspect of the invention is to provide a method of increasing encoding efficiency which allows increasing video quality and/or lowering of the bit rate for a given encoded video quality.

Another aspect of the invention is a video preprocessing method which requires no additional information to be sent from the preprocessor to the encoder.

Another aspect of the invention is a video preprocessing method which increases encoding efficiency without the need of making alterations to the encoder, wherein standard encoders may be utilized.

Another aspect of the invention is a video preprocessing method which increases encoding efficiency of an encoder which can more aggressively encode the data in response to execution of the preprocessing stage.

Another aspect of the invention is a video preprocessing method in which a substantial portion of the random noise from the original source is effectively removed, without negative impact to features identified and extracted from the source video.

Another aspect of the invention is a video preprocessing method which performs the steps of feature extraction into feature planes, noise reduction filtering of a remaining signal, estimation of feature activity, adaptive strength filtering on feature planes, and then combines adaptively filtered feature planes with the noise reduced remaining signal to generate a preprocessed video output configured for receipt by a video encoder.

Another aspect of the invention is a video preprocessing method in which features to be extracted are selected in response to external control or programming and/or data available to the preprocessor.

Another aspect of the invention is a video preprocessing method in which noise reduction filtering is configured to remove a substantial portion of the random noise within the remaining signal.

Another aspect of the invention is a video preprocessing method in which the noise reduction filtering on a remaining plane comprises a low pass filter.

Another aspect of the invention is a video preprocessing method in which extracted features are processed adaptively based on feature activity within each plane of extracted features.

Another aspect of the invention is a video preprocessing method in which areas of complicated texture that are not sensitive to the human eye are aggressively processed while other feature areas are processed in response to their level of activity from delicate to aggressive.

Another aspect of the invention is a video preprocessing method in which features to be extracted are selected from the group of video feature elements consisting essentially of edges, textures, gradient characteristics, and activity.

Another aspect of the invention is a video preprocessing method in which adaptive strength filtering is a block-based operation.

A still further aspect of the invention is a video preprocessing method which is compatible with various video encoders including those operating according to MPEG2/4 or AVC/H.264 standards.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 2 through FIG. 6. It will be appreciated that the apparatus may vary as to configuration and as to details of the parts, and that the method may vary as to the specific steps and sequence, without departing from the basic concepts as disclosed herein.

1. Introduction to Video Preprocessing

An apparatus and method are disclosed for preprocessing video signals before encoding by a video codec, such as according to MPEG2/4 or AVC/H.264 standards. The proposed method first extracts all information (features) deemed important from the original source video. It should be appreciated that what is deemed important may be application specific, and depend not only on the type of video being processed, but its quality, resolution, and other factors.

In this example, noise-removal filtering is applied to the remaining data after feature extraction. In this way, a substantial portion of the random noise from the original source can be effectively removed, while features in the video, having been extracted, are not subject to adverse filter impact.

The extracted features are processed adaptively based on feature activity. For example, if high levels of activity are discerned, then stronger filtering is applied to further remove unnecessary information. As a consequence of removing the unnecessary information before encoding, the coding efficiency (or video quality at a given encoding bit rate) for the video encoder can be improved.

Figure 1:
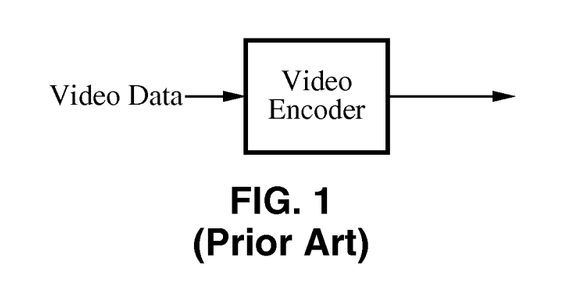
FIG. 1 is a block diagram of conventional video encoding.

FIG. 1 depicts a conventional encoding arrangement in which video data is received by the encoder, encoded within the encoder, and then output.

Figure 2:
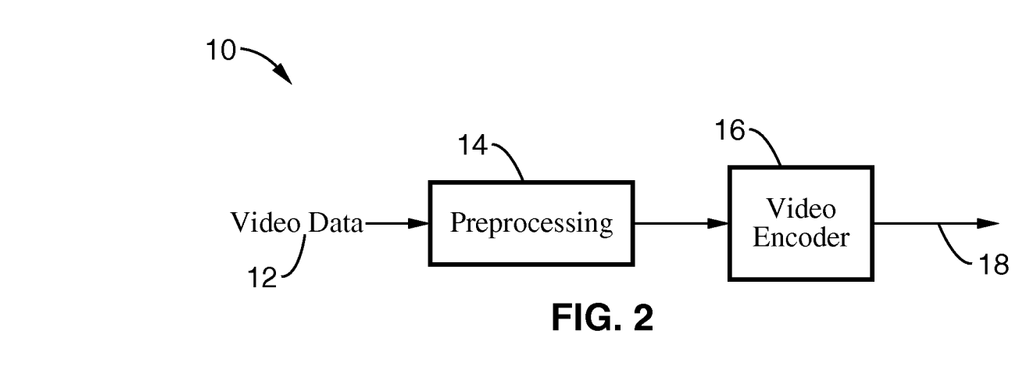
FIG. 2 is a block diagram of video encoding according to an embodiment of the present invention, showing a preprocessing stage performed prior to the encoding.

FIG. 2 illustrates, by way of example embodiment 10, preprocessing performed according to the present invention in relation to the video encoder. Unlike conventional video encoding, in which input video 12 is directly transmitted to a video encoder, the present invention performs preprocessing 14 of the input video data 12 before it is encoded by video encoder 16 (e.g., codec).

Preprocessing in this manner can provide many benefits. One important aspect is that noise, in particular random noise, can be more effectively removed from the original video without affecting the features contained within the signal. It will be appreciated that since the random characteristics of noise (e.g., flat frequency characteristics) can not be efficiently encoded, video containing noise generates poor quality encoding, even when encoded at high bit-rates. Therefore, reducing the level of noise before encoding can significantly enhance the quality and allow for the use of lower bit rate encoding.

Another application of the preprocessing paradigm of the present invention is to manipulate the input video, so as to enhance the human-perceived quality of post-encoded video. By way of example and not limitation, areas of complicated texture that are not sensitive to human eyes can be processed in aggressive ways while some sophisticated areas such as flat or static areas are processed less aggressively, or even in a delicate manner.

The apparatus and method of the present invention performs preprocessing which can be applied to both of the above applications, or their combination, as well as to other related forms of processing, according to the teachings recited herein. The principle stages of the preprocessing method are described in the next sections.

2. Stages of Preprocessing

2.1 Feature Extraction.

The input video is first processed to extract several predefined features. The features can be defined as (1) edges; (2) texture complexity; (3) gradient characteristic; (4) activity, and other features as practiced by those of ordinary skill in the art.

Figure 3:
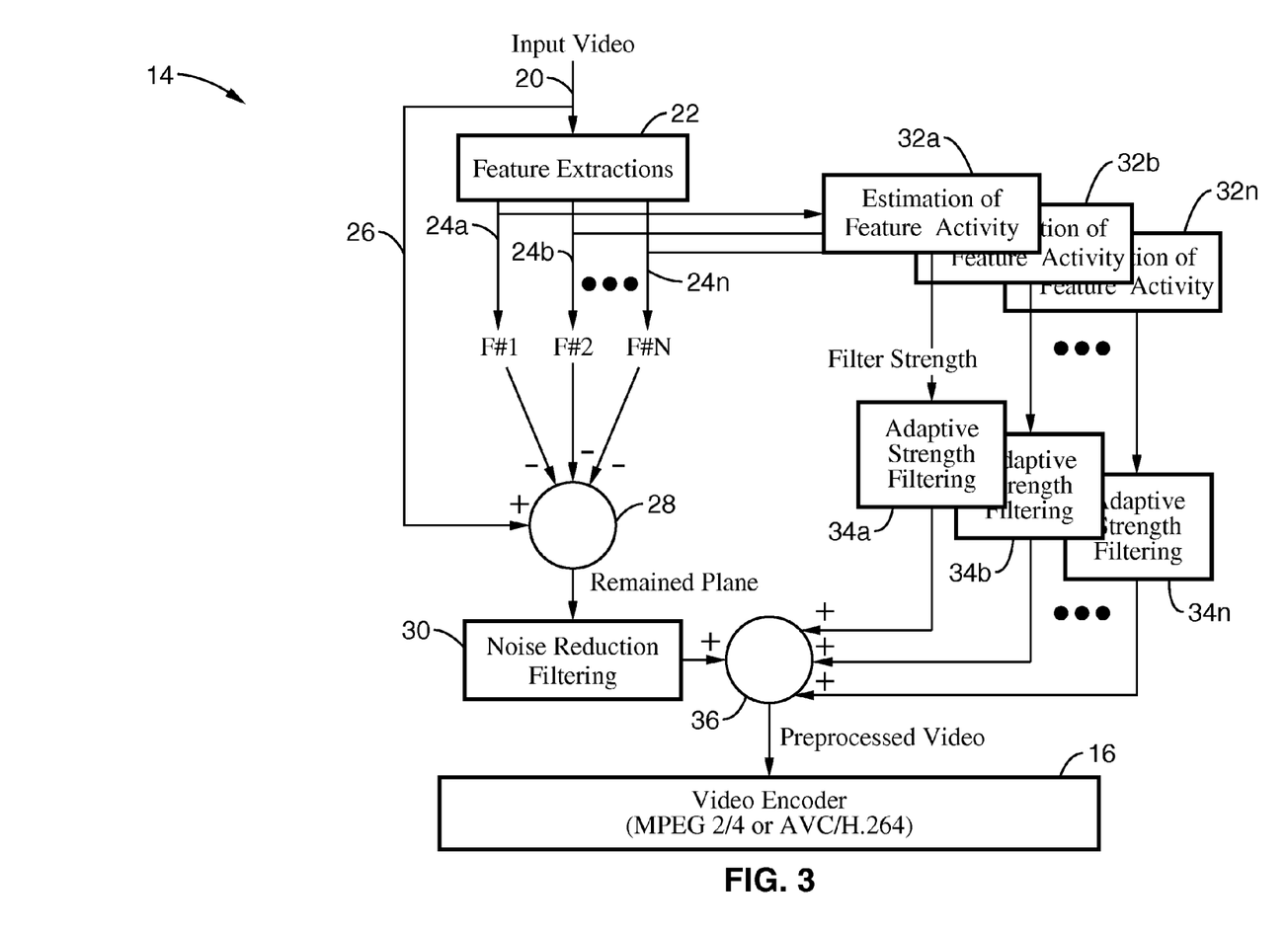
FIG. 3 is a schematic of video preprocessing performed according to an embodiment of the present invention, shown performed in preparation for receipt by a video encoder.

FIG. 3 illustrates preprocessing 14 according to the present invention. It will be appreciated that before feature extraction takes place it must be determined which features are to be extracted. Embodiments of the present invention are not generally limited in the manner in which these features are defined. By way of example and not limitation, the features to be extracted can be defined within preprocessor coding, and/or within a data set coupled to the preprocessor. In addition, the feature set can be predetermined or varied in response to external control, and/or in response to determinations of the nature or character of the video to be encoded. It will be appreciated that the preprocessing of the present invention does not require any alterations in the encoding standard, nor does it require any additional information being entrained or otherwise communicated from the preprocessor to the encoder.

Video input 20 is received and feature extraction performed 22 from the original video data. Feature maps are represented as F#1 24a, F#2 24b, through F#N 24n, with "N" representing any desired depth of feature mapping. Each of these features 24a-24n from the video source is then subtracted in block 28 from original video source signal 26 to generate a remaining signal, also referred to as a remaining plane 28.

2.2 Noise Reduction Filtering

Once all the desired features are extracted, the remaining data from the input video consists of a remaining signal or remaining plane 28. In fact, if sufficient features are extracted, this remaining plane can in one sense represent information which is not important to human perception, wherein it can be considered as noise data. Therefore, a strong level of filtering 30 can be applied to the remaining plane without losing the most important information. By way of example, and not limitation, filter 30 can comprise a low-pass filter, or other practical filter types.

2.3 Adaptive Filtering on Feature Map (or Plane)

For each extracted feature plane 24a-24n, adaptive filtering is applied to control the required information in various areas, such as preferably based on human perceptual models. In the figure are shown estimations 32a-32n of feature activity followed by adaptive strength filtering 34a-34n, which are performed for each feature plane.

2.4 Combining Signals and Output to Video Encoder

Each of the adaptively filtered feature elements is then combined 36 with the noise filtered remaining signal to generate a preprocessed output signal for receipt by encoder 16.

The video data output from the preprocessor is then output as a video source for receipt (e.g., immediately or alternatively after storage) by a video encoder. There are several possible configurations for the video encoder which maximize the impact of preprocessing according to the present invention. For example, rate control can be adjusted to maximize the coding efficiency by allocating the optimal quantization parameters for a given preprocessing condition.

2.5 Detailed Description of Adaptive Filtering

Figure 4:
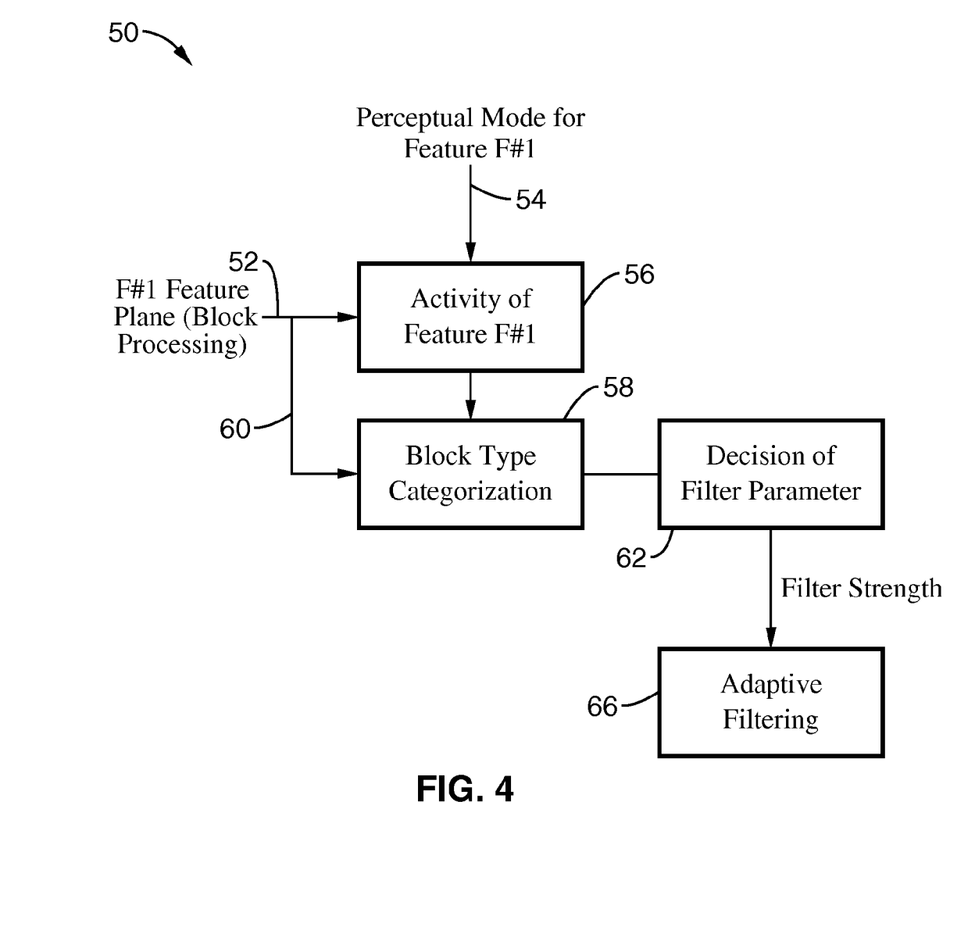
FIG. 4 is a flowchart of adaptive filtering according to an embodiment of the present invention.

FIG. 4 illustrates more detail about the overall operation 50 of adaptive filtering. For simplicity, only one feature F#1 is shown. The other feature planes can be generally considered to be processed in a similar manner.

Adaptive filtering is a block-based operation, in which the feature plane is partitioned into small blocks 52, such as for example 16×16. For each block, the activity of the feature is estimated 56 in response to use of a human perceptual model 54 applied to determine the degree of activity.

Once the degree of activity of the block is decided, the block is categorized 58 into one of several predefined filter parameters 62. By way of example, the filter strength can be defined for each category when performing adaptive filtering 66. High strength filtering implies that the bulk of information in the feature plane can be modified without negatively impacting perceptual quality. Those blocks can be aggressively processed so that the consumed bits in the video encoder can be minimized. Therefore, bits saved from one area can be more efficiently used for more important and perceptually critical areas of the video.

2.6 Overview of Preprocessing Method

Figure 5:
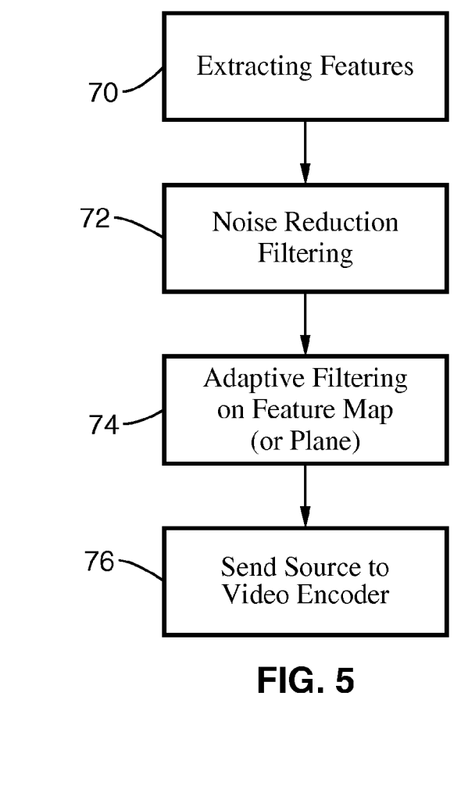
FIG. 5 is a flowchart of preprocessing activity according to an aspect of the present invention.

FIG. 5 illustrates the general steps in the above preprocessing procedure. Features are extracted 70, with noise reduction filtering performed on the remaining video 72. Adaptive strength filtering 74 is then performed on each feature in the feature map, wherein filtering is optimized for each type of feature plane. Finally the non-adaptively filtered video from block 30 in FIG. 3, is merged with the adaptive strength filtering and sent to a video encoder 76.

3. Implementation Example

Figure 6:
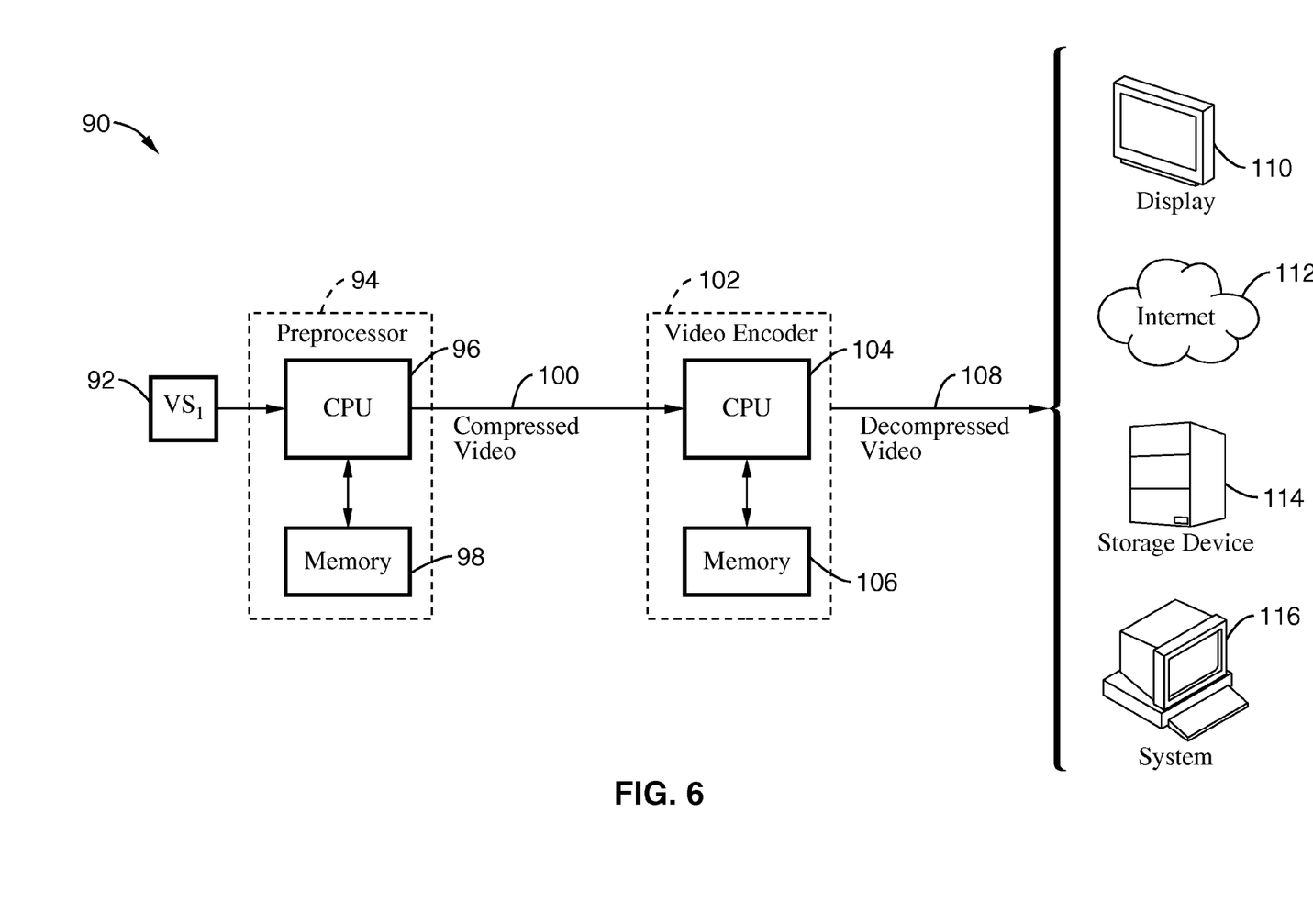
FIG. 6 is a block diagram of video preprocessing and encoding utilizing programming executable on a computer(s) according to an aspect of the present invention, showing computers and memories within the apparatus.

FIG. 6 illustrates an implementation 90 of the present invention in the context of a computer processor enabled preprocessing device 94 and encoder 102. A video source 92 is received by the preprocessor 94 (depicted as surrounded by dashed lines) containing at least one computer processing element 96 (e.g., CPU, microprocessor, DSP, ASIC containing at least one processor core, and so forth) which has access to at least one memory 98. The method described above is executed on the preprocessor 94, such as described by the flowchart of FIG. 3-5, and a compressed video output 100 generated to an encoder 102 (depicted as surrounded by dashed lines) which can be configured in any desired mix of hardware and software, such as similarly containing at least one computer processing element 104 (e.g., CPU, microprocessor, DSP, ASIC containing at least one processor core, and so forth) which has access to at least one memory 106.

It should be appreciated that memories 98, 106 can comprise any desired form(s) of memory, and combinations thereof, into which executable instructions may be received for processing by computer 96, 104, such as internal semiconductor memory (e.g., static random-access memory (SRAM), dynamic random-access memory (DRAM), FLASH, read-only memory (ROM), and other forms of digital memory), as well as receiving information from external memory sources including semiconductor memories, media devices, and so forth.

Similarly, instructions are executed from memory 106 by CPU 104 for performing any desired method of encoding, such MPEG2/4, or H.263/4. A decompressed video output 108 is generated which provides a higher quality signal at a given bit rate than operation of the decoder by itself. Signal 108 can be used in any desired application, such as displayed 110, communicated over a network 112, stored 114, or operated upon in any desired manner 116 that conventional video signals are used.

It should be noted that the preprocessor may share the same CPU and/or memory with an encoder, or be integrated within other video equipment without departing from the teachings of the present invention.

The present invention provides a means for improving decoder performance in response to the inclusion of the preprocessing step. It should be appreciated that the preprocessor function can be selectively utilized, such as depending on the amount of available processing bandwidth available. For example, preprocessing can be performed by a processor that may be otherwise executing other functionality. In addition the extent of feature extraction within the preprocessor can be optimally modulated in response to the available processor bandwidth. Furthermore, it should be recognized that the preprocessor can be switched on or off, without impacting the integrity of the encoding process, however, of course a degradation in encoded video quality would result.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for preprocessing a video signal prior to encoding, comprising:
   means for extracting features from a source video into feature planes which are adaptively filtered;
   partitioning feature planes into blocks, which are categorized into one of multiple filter parameters selected from a plurality of predefined filter parameters;
   wherein a group of said features are extracted from the group of features consisting of edges, texture complexity, gradient characteristic, and activity;
   means for noise reduction filtering of a remaining signal, which remains after extracting features from said source video;
   means for adaptively filtering feature planes based on a level of feature activity; and
   means for recombining adaptively filtered feature planes with a noise reduced version of said remaining signal into a preprocessed video output configured for receipt by a video encoder;
   wherein said apparatus performs preprocessing of video signals toward increasing coding efficiency at a recipient video encoder by providing an increase in video quality and/or a lowered bit rate for a given encoded video quality.

2. A method of preprocessing a source video signal prior to encoding, comprising:
   extracting features from a source video and producing feature planes and a remaining signal without the extracted features within a preprocessor;
   partitioning each of said feature planes into blocks, said blocks being categorized into one of multiple filter parameters selected from a plurality of predefined filter parameters;
   wherein a group of said features are extracted from the group of features consisting of edges, texture complexity, gradient characteristic, and activity;
   noise reduction filtering of a remaining signal, which remains after extracting features from said source video;
   estimation of feature activity for said feature planes;
   adaptive strength filtering on said feature planes based on a level of feature activity; and
   combining adaptively filtered feature planes with a noise reduced version of said remaining signal to generate a preprocessed video output configured for receipt by a video encoder;
   wherein said method performs preprocessing of a source video signal toward increasing coding efficiency at a recipient video encoder by providing an increase in video quality and/or a lowered bit rate for a given encoded video quality.

3. A method as recited in claim 2, wherein the features to be extracted are selected in response to external control, programming and/or data available to said preprocessor.

4. A method as recited in claim 2, wherein said noise reduction filtering is configured to remove at least a portion of random noise within said remaining signal.

5. A method as recited in claim 2, wherein said noise reduction filtering comprises a low pass filter.

6. A method as recited in claim 2, wherein said extracted features are processed adaptively based on feature activity within each plane of extracted features.

7. A method as recited in claim 2, wherein said preprocessing aggressively processes areas of complicated texture that are not sensitive to a human eye while other feature areas are processed, from delicately to aggressively, in response to their level of activity.

8. A method as recited in claim 2, wherein said level of feature activity is estimated
   within each block in response to a human perceptual model to output a degree of activity.

9. A method as recited in claim 2, wherein only the preprocessed video output need be communicated to an encoder, and no additional information needs to be sent from the preprocessor to an encoder.

10. A method as recited in claim 2, wherein said preprocessing output is compatible with encoders operating according to MPEG2/4 standards.

11. A method as recited in claim 2, wherein said preprocessing output is compatible with encoders operating according to AVC/H.264 standards.

12. A method as recited in claim 2, wherein said preprocessing method is performed in response to programming, retrieved from a memory, and executing on at least one computer processor.

13. A method as recited in claim 12, wherein said at least one computer processor is integrated within a preprocessing module configured for connection to an encoder device.

14. A method as recited in claim 12, wherein said at least one computer processor is integrated within an encoder device configured to perform preprocessing and encoding.

15. A method as recited in claim 14, wherein at least a first computer processor performs preprocessing while at least a second computer processor performs encoding of the preprocessed video output.

16. A method as recited in claim 14, wherein said at least one computer processor performs both preprocessing functions and encoding functions.

17. An apparatus for preprocessing video signals in preparation for encoding, comprising:
    a computer configured for processing received video signals; and
    programming executable on said computer for,
    extracting features from said video signals and producing feature planes and a remaining signal without the extracted features,
    partitioning each feature plane of said feature planes into blocks, wherein said blocks are categorized into one of multiple filter parameters selected from a plurality of predefined filter parameters;
    wherein a group of said features are extracted from the group of features consisting of edges, texture complexity, gradient characteristic, and activity;
    noise reduction filtering of a remaining signal, which remains after extracting features from said video signals,
    estimation of feature activity for said feature planes,
    adaptive strength filtering on said feature planes based on a level of feature activity, and
    combining adaptively filtered feature planes with a noise reduced version of said remaining signal to generate a preprocessed video output configured for receipt by a video encoder;
    wherein preprocessing the video signals increases coding efficiency at a recipient video encoder providing an increase in video quality and/or a lowered bit rate for a given encoded video quality.

18. A non-transitory computer-readable media containing a computer program executable on a computer configured for processing a video signal and causing the computer to preprocess the video signal in preparation for receipt by an encoder, in response to steps, comprising:
- extracting features from a video signal and producing feature planes and a remaining signal without the extracted features within a preprocessor;
- partitioning each feature plane of said feature planes into blocks, wherein said blocks are categorized into one of multiple filter parameters selected from a plurality of predefined filter parameters;
- wherein a group of said features are extracted from the group of features consisting of edges, texture complexity, gradient characteristic, and activity;
- noise reduction filtering of the remaining signal, which remains after extracting features from said video signal;
- estimation of feature activity for said feature planes;
- adaptive strength filtering on said feature planes based on a level of feature activity; and
- combining adaptively filtered feature planes with a noise reduced version of said remaining signal to generate a preprocessed video output configured for receipt by a video encoder;
- wherein preprocessing the video signal increases coding efficiency at a recipient video encoder by providing an increase in video quality and/or a lowered bit rate for a given encoded video quality.

* * * * *